United States Patent [19]

Satake et al.

[11] Patent Number: 4,910,235

[45] Date of Patent: Mar. 20, 1990

[54] POLYESTER FILM FOR RECORDING MATERIALS

[75] Inventors: Seimi Satake; Yukio Shinagawa; Toshio Shibata, all of Kanagawa, Japan

[73] Assignee: Fuji Photo Film Co., Ltd., Kanagawa, Japan

[21] Appl. No.: 197,136

[22] Filed: May 23, 1988

[30] Foreign Application Priority Data

May 22, 1987 [JP] Japan .................................. 62-125518

[51] Int. Cl.$^4$ .......................... C08K 9/02; C08K 3/34; C08K 3/22

[52] U.S. Cl. ..................................... 523/171; 523/200; 524/605

[58] Field of Search ................... 523/171, 200

[56] References Cited

U.S. PATENT DOCUMENTS

| | | | |
|---|---|---|---|
| 4,134,776 | 1/1979 | Rieger et al. | 523/171 |
| 4,269,916 | 5/1981 | Bilofsky et al. | 430/11 |
| 4,753,829 | 6/1988 | Panush | 523/171 |

Primary Examiner—Lewis T. Jacobs
Attorney, Agent, or Firm—Sughrue, Mion, Zinn, Macpeak & Seas

[57] ABSTRACT

A polyester film containing 20% or less by weight of a mixture comprising a white pigment and a pearlescent pigment is disclosed. The polyester film has a pearly luster and a high degree of whiteness.

8 Claims, No Drawings

POLYESTER FILM FOR RECORDING MATERIALS

FIELD OF THE INVENTION

This invention relates to a polyester film having a white pearly tone suitable as a support of recording materials, such as photographic films and, particularly, reflective photographic materials.

BACKGROUND OF THE INVENTION

In reflective photographic materials (generally called photographic papers), conventionally employed paper supports laminated with a high polymer, e.g., polyolefins, have recently been replaced with white polyester films containing a white pigment, e.g., titanium dioxide, barium sulfate, etc., because the white polyester films are superior to the laminated paper in gloss and smoothness to emphasize image sharpness and to promote high quality.

Various techniques for incorporating a white pigment into the film-forming high polymer have been proposed. For example, Japanese Patent Application (OPI) No. 114921/74 (the term "OPI" as used herein means "unexamined published Japanese patent application") which corresponds to British Patent No. 1436927 discloses a reflective photographic material comprising a light-sensitive layer provided on a styrene resin sheet containing a white pigment having an average particle size of 1.5 μm or less. Japanese Patent Application (OPI) No. 54428/77 (corresponding to British Patent Nos. 1563591 and 1563592) discloses a reflective photographic material using a polyester sheet containing barium sulfate having a specific particle size. Japanese Patent Application (OPI) No. 148832/79 describes a matte polyester film containing titanium dioxide. Further, Japanese Patent Application (OPI) No. 118746/86 (corresponding to European Patent No. 182253) discloses a reflective photographic material using a support containing surface-treated titanium dioxide having a specific particle size.

However, it has been difficult to obtain a pearly luster from the conventionally known white pigment alone, though giving a high degree of whiteness. A polyester film containing the white pigment may take on a new luster upon stretching due to voids formed in layers around the pigment, but such does not answer out purpose of obtaining a pearly luster.

SUMMARY OF THE INVENTION

One object of this invention is to provide a polyester film having a pearly luster as well as a high degree of whiteness.

Another object of this invention is to provide a polyester film having a sufficient opacifying property for use as a support of reflective recording materials.

A further object of this invention is to provide a polyester film as a support of reflective recording materials which improves image sharpness to produce special image effects through a high degree of whiteness and a pearly luster.

It has now been found that the above objects of this invention can be accomplished by a polyester film containing 20% or less by weight of a mixture comprising a white pigment and a pearlescent pigment.

Unlike ordinary pigments causing light scattering or selective absorption of light, pearlescent pigments give a pearly luster through multiple reflection of incident light. The luster of the silvery scales of fish is a natural case of the pearly luster.

DETAILED DESCRIPTION OF THE INVENTION

Hitherto known pearlescent pigments include white lead and aluminum pigments. The most preferred pearlescent pigment in the present invention is a mica pigment whose surface is coated with titanium dioxide (hereinafter referred to as "titanium-coated mica"). This is because titanium itself has a high refractive index so that a sufficient pearly luster can be obtained with its small amount added to polyester and also because it can be used safely without a danger of dust explosion, etc. as is involved in the case of using aluminum pigments. Specific examples of the titaniumcoated mica which can be used in the present invention include a series of "Iriodin", a trade name of pearlescent pigments comprising natural mica and titanium oxide produced by Merck Co. Among them, No. 4584 is the most suitable in view of its small average particle size and excellent film-forming properties.

Particles of the pearlescent pigment preferably have a tabular form, and specifically having a flat plane of from 10 to 10,000 μm$^2$ and a thickness of 800 Å or less.

The optical thickness (thickness x refractive index) of the pearlescent pigment particles is preferably 2,000 Å or less, and more preferably 1,600 Å or less. The higher the refractive index, the better.

The white pigment which can be used in the present invention is not particularly limited and includes titanium dioxide, barium sulfate, and the like. From the standpoint of high refractive index, the most effective is titanium dioxide, whose crystal structure is not limited, including an anatase structure, a rutile structure, etc. When weather resistance is especially required, rutile-type titanium dioxide which is less likely to cause chalking is preferably selected. From the viewpoint of film-forming properties, such as stretchability and filtrability of a molten mixture, and surface gloss, titanium dioxide preferably has a particle size of 0.5 μm or less, and more preferably contains no coarse particles of 50 μm or greater. Since such coarse particles may be formed by agglomeration of primary particles, surface treatment of the pigment particles would be effective for prevention of agglomeration.

The polyester resin which can be used in the present invention suitably include thermoplastic polyesters (generally called aromatic polyesters), such as polyethylene terephthalate, polybutylene, terephthalate, etc. Mixtures of the aromatic polyesters with those composed of naphthalates, cyclohexane-1,4-dimethanol, etc. or copolyesters comprising the same may also be used.

The amount of the mixture of the white pigment and pearlescent pigment to be added to a polyester should not exceed 20% by weight in order to ensure acceptable film-forming properties. Particularly, such an amount ensures resistance to breaking upon film stretching. In order to attain an opacifying effect required as support for reflective photographic materials, it is desirable to add at least 10% by weight of the pigment mixture. Further, the proportion of the pearlescent pigment in the pigment mixture is preferably 50% by weight or less from the standpoint of degree of pearlescent attained. If the proportion exceeds 50% by weight, not only does the resulting luster become unnatural but film-forming properties are seriously deteriorated.

The manner of addition of the pigments is not particularly restricted. For example, the pigments can be added at an arbitrary stage, such as during the polymerization reaction, or immediately before extrusion, etc. Considering prevention of agglomeration of the pigment particles and handling properties, it is desirable that the pigments are dispersed under a forced shear force in a Banbury mixer, a twin-screw extruder, etc. to prepare a master batch.

The polyester containing the pigment mixture can be formed into a film in a usual manner, as described in, for example, Orville J. Sweeting, The Science and Technology of Polymer Films, Chapter 14, pp. 587–633. Special film forming techniques, such as co-extrusion, can also be adopted.

Since a pearly luster is produced by miltiple reflection of incident light as mentioned above, the pearlescent pigment particles are preferably aligned as parallel as possible to the film plane in order to form a layer structure. To this effect, it is effective to biaxially stretch the polyester film.

In order to improve whiteness, a white pigment is often combined with a fluorescent brightening agent. In the present invention, preferred examples of such a fluorescent brightening agent include "KSN" produced by Hoechst (Hostalux KS-N, a bisbenzoxazolylstilbene derivative) and "OB" produced by Eastman Chemical (Uvitex OB, 2,5-bis-(5'-tertiary-butylbenzoxazolyl(2))-thiophene).

The polyester film according to the present invention is suitable for use as a support for black-and-white or color reflective photographic materials. It is also applicable as substitution for a support of photographic papers described, e.g., in Japanese Patent Application (OPI) No. 177541/84. Other recording materials to which the polyester film of the invention is applicable as a support include a color developer sheet for a pressure-sensitive recording system as described in Japanese Patent Application (OPI) No. 179784/86, heat-sensitive recording paper as described in Japanese Patent Application (OPI) No. 190886/84 (corresponding to U.S. Pat. No. 4,650,740), an image-receiving sheet for an image recording system as described in Japanese Patent Application (OPI) No. 278849/86, and heat-sensitive transfer recording materials, ink jet recording materials, and the like.

The present invention is now illustrated in greater detail with reference to Example 1 and Comparative Example 1, but it should be understood that the present invention is not limited thereto. In these examples, all the percents and ratios are by weight unless otherwise indicated.

EXAMPLE 1

A master batch comprising 50% polyethylene terephthalate and 50% of anatase-type titanium dioxide having an average particle size of 0.3 $\mu$m and a master batch comprising 90% polyethylene terephthalate and 10% of Iriodin No. 4584 (a trade name of pearlescent pigment) were prepared. Using these master batches, a polyethylene terephthalate sheet having a total pigment content of 15% (titanium dioxide:Iriodin=3:2) was prepared. The sheet was stretched 3.4 times in the longitudinal, or machine, direction (MD=machine direction) and then 3.4 times in the transverse direction (TD=transverse direction) to obtain a 100 $\mu$m thick biaxially stretched polyester film.

COMPARATIVE EXAMPLE 1

A biaxially stretched polyester film was prepared in the same manner as in Example 1, except for using ony a titanium dioxide master batch so as to have a final pigment content of 15%.

Each of the polyester films prepared in Example 1 and Comparative Example 1 was determined for gloss by means of a glossmeter ("VG-10" manufactured by Nippon Denshoku K.K.) at an angle of 60° and for percent transmission of total light rays by means of a Ulbricht sphere ("Haze meter HSDR Model" manufactured by Nippon Seimitsu Kogaku K.K.). Further, tensile strength of each film sample having a size of 10 mm (width)×100 mm (length) was measured by means of a tensile tester ("Tensilon UTM-IIIL Model" manufactured by Toyo Baldwin Co., Ltd.) at a rate of pulling of 200 mm/min. A pearly luster of each sample was visually observed. The results of these measurements or evaluations are shown in Table 1 below.

TABLE 1

| | Gloss | Percent Transmission of Total Light Rays (%) | Tensile Strength (Kg/mm$^2$) MD | TD | Pearly Luster |
|---|---|---|---|---|---|
| Example 1 | 66 | 10 | 16.5 | 16.5 | observed |
| Comparative Example 1 | 35 | 7 | 16.7 | 15.6 | not observed |

As can be seen from the Table, the polyester film according to the present invention has a pearly luster as well as high whiteness while being equal in tensile strength to the conventional polyester film.

While the invention has been described in detail and with reference to specific embodiments thereof, it will be apparent to one skilled in the art that various changes and modifications can be made therein without departing from the spirit and scope thereof.

What is claimed is:

1. A polyester film containing 20% or less by weight of a mixture comprising a white pigment and a pearlescent pigment, wherein said polyester film is a biaxially stretched polyester film.

2. A polyester film as claimed in claim 1, wherein said pearlescent pigment is mica coated with titanium dioxide.

3. A polyester film as claimed in claim 1, wherein said pearlescent pigment has a tabular form having a plane area of from 10 to 10,000 $\mu$m$^2$ and a thickness of 800 Å or less.

4. A polyester film as claimed in claim 1, wherein said pearlescent pigment has an optical thickness of 2000 Å or less.

5. A polyester film as claimed in claim 1, wherein said white pigment is titanium dioxide.

6. A polyester film as claimed in claim 5, wherein said titanium dioxide has a particle size of 0.5 $\mu$m or less.

7. A polyester film as claimed in claim 1, wherein said mixture is present in an amount of at least 10% by weight.

8. A polyester film as claimed in claim 1, wherein said pearlescent pigment is present in an amount of 50% or less by weight based on the mixture.

* * * * *